US008669668B2

(12) United States Patent
Levy (10) Patent No.: US 8,669,668 B2
(45) Date of Patent: Mar. 11, 2014

(54) OCEAN SWELL ENERGY CONVERSION APPARATUS

(76) Inventor: Yossef Levy, Kfar Yona (IL)

( * ) Notice: Subject to any disclaimer, the term of this patent is extended or adjusted under 35 U.S.C. 154(b) by 32 days.

(21) Appl. No.: 13/423,223

(22) Filed: Mar. 18, 2012

(65) Prior Publication Data

US 2012/0235414 A1    Sep. 20, 2012

(30) Foreign Application Priority Data

Mar. 17, 2011   (IL) .......................................... 211769

(51) Int. Cl.
*F03B 13/10*    (2006.01)
(52) U.S. Cl.
USPC ............................................. 290/42; 290/53
(58) Field of Classification Search
USPC ....................................................... 290/42, 53
See application file for complete search history.

(56) References Cited

U.S. PATENT DOCUMENTS

| 1,076,844 | A | | 10/1913 | Shipman | |
|---|---|---|---|---|---|
| 4,352,023 | A | * | 9/1982 | Sachs et al. | 290/42 |
| 4,539,484 | A | * | 9/1985 | Suggs | 290/53 |
| 7,536,859 | B2 | * | 5/2009 | Tai et al. | 60/497 |
| 2006/0028026 | A1 | * | 2/2006 | Yim | 290/53 |
| 2009/0015013 | A1 | | 1/2009 | Jaer | |
| 2009/0230684 | A1 | * | 9/2009 | Gasendo | 290/53 |

* cited by examiner

*Primary Examiner* — Tho D Ta (57) ABSTRACT

An apparatus for the conversion of the energy of sea or ocean swells. The apparatus comprises: a frame including a vertical post and horizontal beam; a first generator slidably connected to the vertical post; a second generator slidably connected to the horizontal beam; a first pinion connected to the first generator; a second pinion connected to the second generator; a float; a connection mechanism for connecting the float to the generators; a horizontal first rack connected to the float for engaging the first pinion; a vertical second rack connected to the one float for engaging the second pinion, wherein all components connected to the float are disposed at or above sea level.

15 Claims, 7 Drawing Sheets

OCEAN SWELL ENERGY CONVERSION APPARATUS

FIELD OF THE INVENTION

The present invention relates to alternate energy, in particular an apparatus adapted to convert energy from ocean swells (waves), typically to electrical energy.

BACKGROUND OF THE INVENTION

Apparatus to convert the energy of waves or swells in the ocean have typically been designed to exploit only the energy of the rising and falling of the swells/waves. However, in a complete cycle of an ocean swell, there is an elliptical movement of the swell whereby there is both an up and down motion and a to and fro (shoreward and seaward) motion. In addition, there is typically motion, for example side to side motion, for reasons such as wind or other weather-related phenomena and the like.

Previous attempts to design an apparatus that harnesses both the in/out and to/fro motion of ocean swells or waves have been disclosed, for example, in US 2009/015013 (Jaer) and U.S. Pat. No. 1,076,844 (Shipman) in order to increase the efficiency or capacity of the energy conversion.

US 2009/015013 (Jaer) discloses a wave power converter for implementation at an offshore location where it will be exposed to passing waves and swell. The converter comprises a buoyancy element placed within a reaction structure so as to move at least vertically relative to the reaction structure, with a force transfer mechanism that connects the buoyancy element to the reaction structure and transfers at least vertical relative motion between the buoyancy element and the reaction structure to a linear energy converting arrangement in the reaction structure. The force transfer mechanism is articulated and configured to transfer compression, tension and shear reactions, but essentially no movements, between the buoyancy element and the reaction structure and at the same time allow limited rotational movements between the buoyancy element and the reaction structure about at least two orthogonal axes (X, Y).

U.S. Pat. No. 1,076,844 (Shipman) provides an ocean wave converter ("wave motor") comprising a support, a shaft carried thereby, a float, a vane depending below the float, means whereby the center of motion of the float is caused to be below the surface of the water, and means connected with the float to operate the shaft. As disclosed in the patent, this ocean wave converter necessitates a constant mean level of water, and a uniform wave height, and there would not continuously operate in water subject to tides or variable waves.

SUMMARY OF THE INVENTION

The present invention relates to an apparatus adapted to convert energy from ocean swells (waves), typically to electrical energy.

In accordance with embodiments of one aspect of the present invention there is provided an apparatus for the conversion of the energy of sea or ocean swells, the apparatus comprising: a frame fixable in an area of the sea or ocean having swells and including a vertical post and horizontal beam; at least one first generator slidably connected to the vertical post; at least one second generator slidably connected to the horizontal beam; a first pinion operably connected to each of the at least one first generator; a second pinion operably connected to each of the at least one second generator; at least one float; a connection mechanism for keeping the float operably connected to the generators; a generally horizontal first rack operably connected to each of the at least one float for engaging each first pinion; a generally vertical second rack operably connected to each of the at least one float for respectively engaging each second pinion; wherein all components connected to the float are disposed at or above sea level.

In particular embodiments, all moving parts are disposed at or above sea level; and/or the apparatus is not limited to any particular sea level or sea level range; and/or the horizontal rack(s) are linear; and/or first generator(s) are operably connected to first AC/DC convertor(s) and the second generator (s) are operably connected to second AC/DC convertor(s); and/or the frame is Pi-shaped; and/or the racks comprise stoppers to prevent disengagement from the generators. In some embodiments, the apparatus includes an alignment mechanism or a mechanism for allowing one or more racks to move at an angle with respect to respective generators.

In some embodiments, the apparatus includes a third generator and associated components, analogous to the components associated with the first and second generators, in particular a third rack, inter alia. This third generator is useful for harnessing swell/wave energy in a direction not of the direction of the first and second generators; typically side-to-side swell motion wherein the third rack is mutually orthogonal to the first and second racks.

Herein the description and claims, the term "slide"; "sliding"; "slidingly" (and derivations thereof) will be understood to mean any respective form of movement, for example gliding, rolling, translating and the like, whereby one component can move with respect to another.

Exemplary advantages of the present wave energy converter include ease of maintenance as all the moving parts are at or above sea level (in the present apparatus, the float(s) are considered to be at or above sea level); no hindrance of the moving components by the ocean or sea water; no limitation to the location in regards to tides or swell height; it comprises a minimal number of parts and is thus will tend to be less costly to manufacture, assemble and maintain; and it is not limited to a particular or known sea/ocean water level rather only requires knowing the maximal wave/swell height and to and fro distance in the location it is erected for proper design of the apparatus.

BRIEF DESCRIPTION OF THE DRAWINGS

The present invention will be understood and appreciated more fully from the following detailed description taken in conjunction with the appended drawing in which:

FIGS. 3a-3d are schematic views of another embodiment of the present invention wherein FIG. 3a is a top view.

The following detailed description of embodiments of the invention refers to the accompanying drawing referred to above. Dimensions of components and features shown in the figures are chosen for convenience or clarity of presentation and are not necessarily shown to scale. Wherever possible, the same reference numbers will be used to refer to the same and like parts.

DESCRIPTION OF EMBODIMENTS OF THE INVENTION

Illustrative embodiments of the invention are described below. In the interest of clarity, not all features/components of an actual implementation are necessarily described.

Figure 1A:
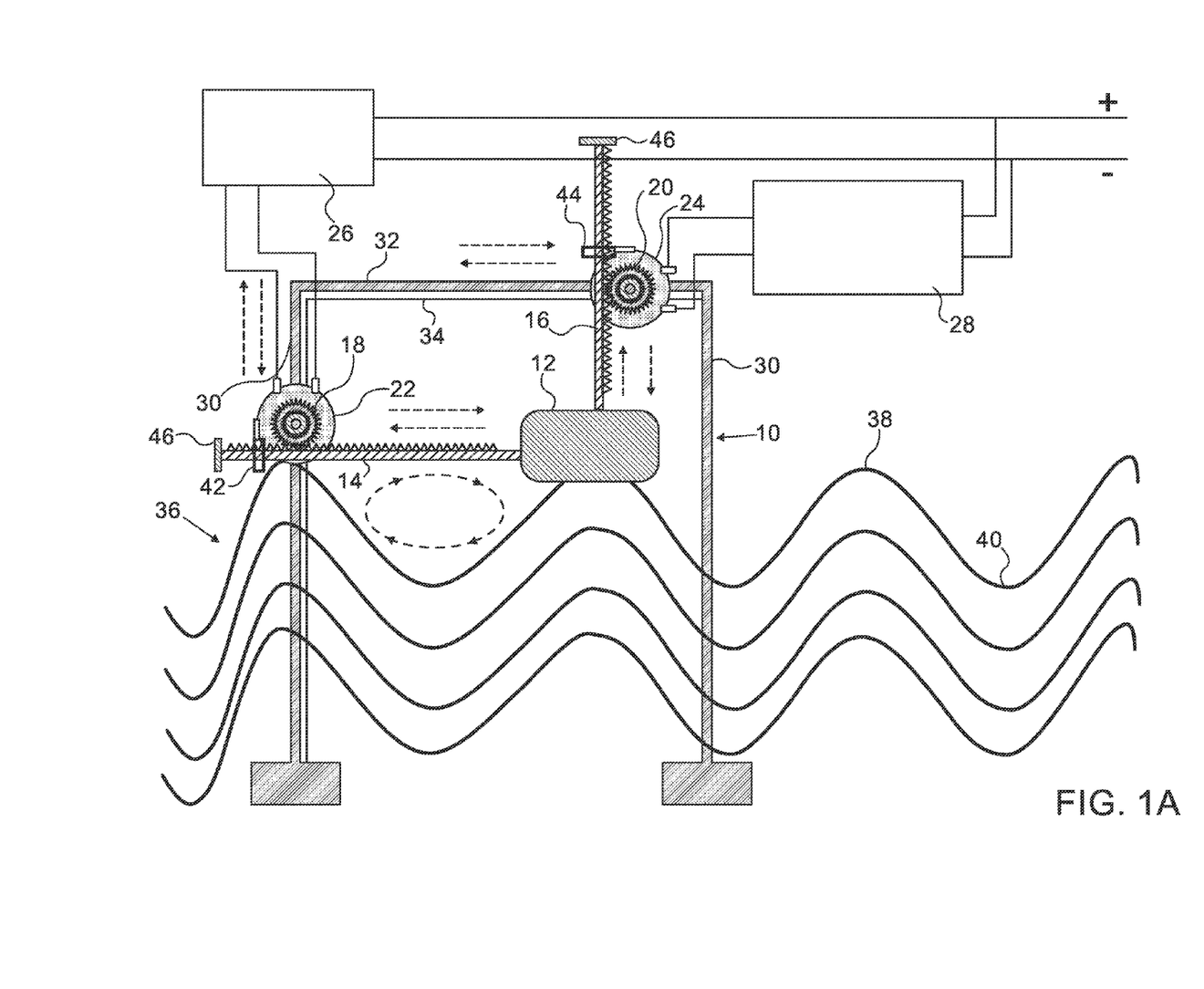
FIG. 1a is a schematic side view of an embodiment of an ocean swell energy conversion apparatus of the present invention.

FIG. 1a shows an embodiment of an ocean swell energy conversion apparatus of the present invention comprising: a frame 10; a float 12; a generally horizontal rack 14; a generally vertical rack 16; a first pinion 18; a second pinion 20; a first generator 22 slidingly connected to frame 10; a second generator 24 slidingly connected to frame 10; a first AC/DC convertor, for example rectifier 26; and a second AC/DC convertor for example rectifier 28. First generator 22 and second generator 24 are operably connected to first rectifier 26 and second rectifier 28, respectively.

The apparatus further includes a connection mechanism to operably connect float 12 to the generators 22 and 24, for example, via a first rack-to-generator connector 42 and a second rack-to-generator connector 44, through which racks 14 and 16 respectively pass. Rack-to-generator connectors 42 and 44 may include wheels or the like (not visible) upon which racks 14 and 16 respectively slide (roll, for example using ball bearings; etc) in order to reduce friction. The apparatus typically also includes stoppers 46 at or near distal ends of racks 14 and 16 to prevent the racks and float 12 from disengaging from generators 22 and 24 in case of swells 36 that are particularly large—although the use of appropriately long racks may suitably perform that function.

Horizontal rack 14 extends horizontally from float 12, generally perpendicular to the crests 38 and troughs 40 of the swells 36; and vertical rack 16 extends upward from float 12. Racks 14 and 16 engage pinions 18 and 20, respectively. Pinions 18 and 20 are respectively connected to generators 22 and 24.

Frame 10 is typically an L-shaped, inverted U-shaped (i.e. Pi-shaped) or a rectangular structure. A Pi-shaped frame is illustrated in the figure comprising a pair of substantially vertical posts 30 and a horizontal cross beam 32 connecting the tops of the vertical posts. The lower portion of frame 10 is typically embedded in the sea floor, however it may be possible for the frame to be otherwise anchored, for example by weights or by chains or rods extending from the shore or another stationary structure, for example wave breakers.

It is a particular feature of the invention that the upper portion of frame 10 and the other aforementioned components are at or above sea level. As such, there are no moving parts below sea level, a situation which would tend to make maintenance more difficult and potentially hinder movement of any moving components below sea level, for example due to the viscosity and/or movement of the water. Furthermore, due to the design of the apparatus, its operation is not dependant on the height of waves or tides.

First generator 22 is slidably attached to one of the vertical posts 30 and second generator 24 is slidably attached to horizontal beam 32. This slide-ability can be achieved by any known means, for example a sleeve or a track 34 and which may employ wheels (not shown) or the like to reduce friction.

As swells 36 rise and fall, as well as ebb and flow, float 12 moves up and down and back and forth (shoreward and seaward), respectively, causing racks 14 and 16 to undergo the same movement. The movement of racks 14 and 16 rotates the pinions 18 and 20 both clockwise and counter-clockwise thereby "operating" generators 22 and 24 to produce electricity.

As mentioned above, rack-to-generator connectors 42 and 44 may also include wheels or the like (not visible) upon which racks 14 and 16 respectively slide, in order to reduce friction. The wheel adaptation may include, for example, spring bearings (not shown).

Figure 1B:
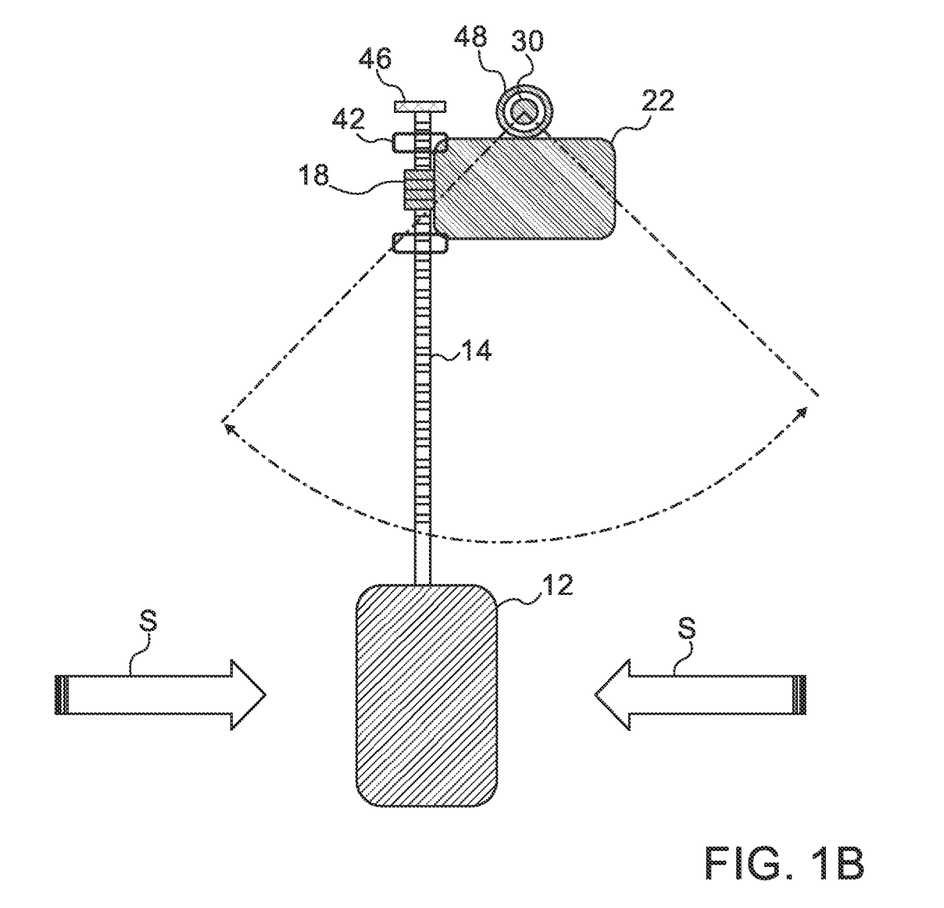
FIG. 1b is a top partial view of FIG. 1A.

As illustrated in FIG. 1b, in some embodiments, generator 22 can both slidingly and pivotally move on vertical post 30; for example via a sliding and pivoting sleeve 48 whereby rack 14 can move at an angle with respect to generator 22 (illustrated by dashed lines), as may occur when there is a sideways movement of the waves/swells 36 (represented by sideways arrows S), which can be caused by wind or tides for example. A pair of rack-to-generator connectors 42 are shown, which can be useful for stability; alternatively a long sleeve-like rack-to-generator connector (not shown), with a cut-out for allowing engagement of pinion 18 with rack 14, can be used.

Figure 2:
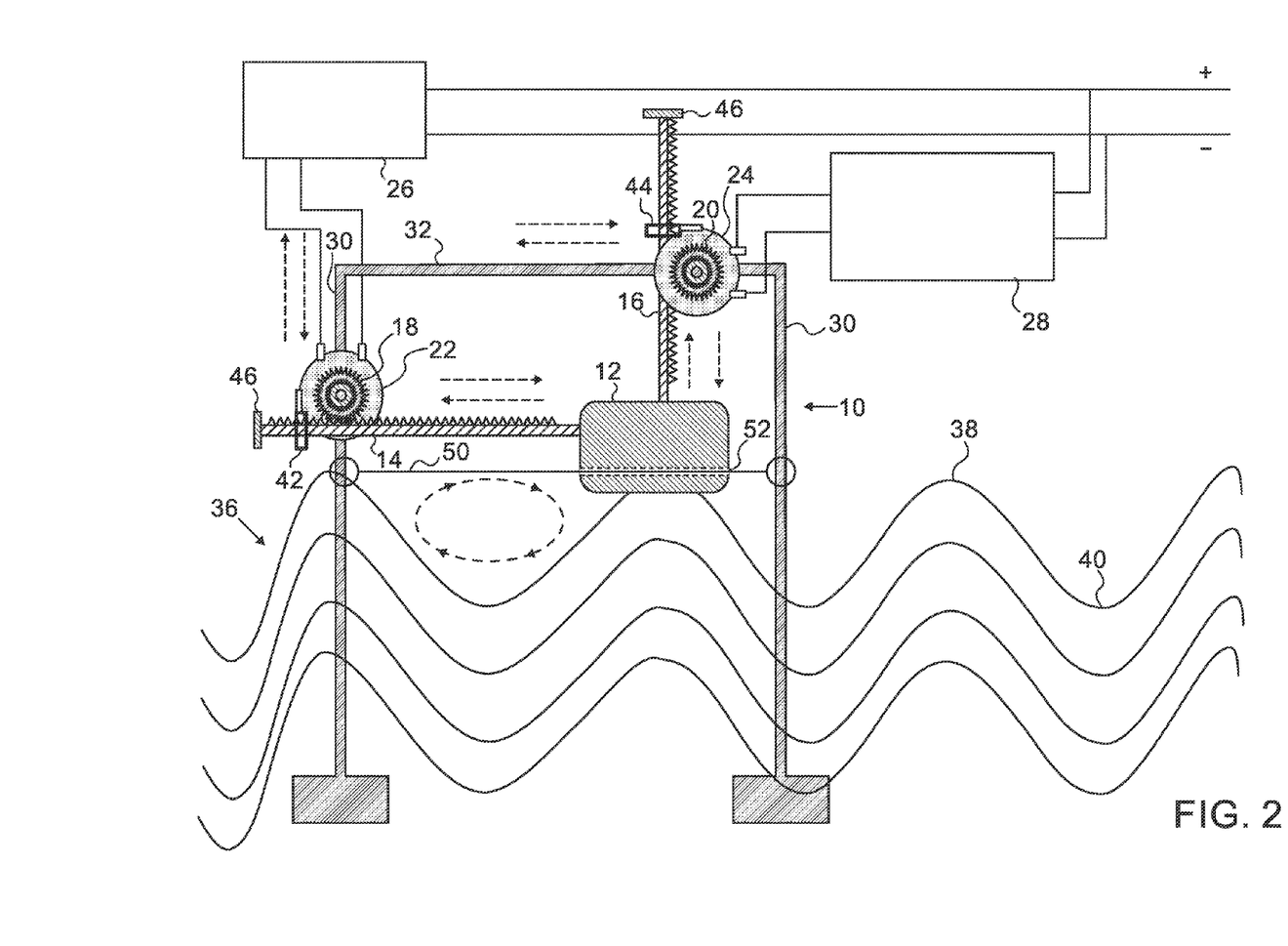
FIG. 2 is a schematic side view illustrating a modification of the embodiment of FIG. 1A.

FIG. 2 shows another embodiment, wherein the apparatus includes a float stabilizing or alignment mechanism, for example an alignment rod 50 that is slidingly attached to vertical posts 30 and is attached to float 12 or passes through a passage 52 thereof. Alignment bar 50 ensures that both first and second generators 22 and 24 (i.e. their respective pinions 18 and 20) will be properly aligned with float 12 (i.e. respective first and second racks 14 and 16). Alternatively, float 12 may include a framework (not shown) or other such structure to facilitate attachment of rod 50 to the float. Alignment rod 50 keeps horizontal rack 14 aligned with pinion 18, which is attached to first generator 22; and, due to generator 24 being constrained to move along horizontal beam 32 of frame 10, alignment rod 50 also keeps vertical rack 16 aligned with pinion 20, which is attached to second generator 24.

FIGS. 3a-3d illustrate another embodiment of the present invention wherein the apparatus includes a third generator 24a for exploiting the sideways motion of the waves/swells 36 (i.e. sideways movement of float 12). For clarity/visualization, not every component of the apparatus is shown in every view. Analogous to the above-described embodiments, third generator 24a engages a third pinion 20a that is spun back and forth by a third rack 16a attached to float 12. Third rack 16a is disposed at an essentially 90 degree angle with respect to first rack 14 and second rack 16. Third rack 16a passes though a third rack-to-generator connector 44a and has a stopper 46a.

To help visual and understand this embodiment, one can consider that frame 10 (FIG. 1a) has been designed as a modified frame 10a that moves back and forth along a support structure 100, for example by means of a set of upper and lower wheels 54. First generator 22 can move up and down on a vertical post 30a of frame 10a; and second generator 24 can move shoreward and seaward on a horizontal beam 32a of frame 10a, analogously to as in FIG. 1a. This back and forth movement of frame 10a on support structure 100, when sideways movement of the swells 36 or waves occurs, can be exploited by third generator 24a.

To ensure stable and aligned movement of float 12, in addition to alignment rod 50 (as noted in the embodiment of FIG. 2), this 3-generator embodiment (FIGS. 3a-3d) includes an additional (second) alignment rod 50a for aligning float 12 with third generator 24a (or constraining the moving components in suitable alignment). To allow third generator 24a to move up and down with float 12, the generator is connected, for example by a sleeve or ring 56 (FIG. 3d), to second alignment rod 50a. To allow seaward and shoreward movement of third generator 24a, second alignment rod 50a is slidably attached to cross-beams 102 of support structure 100. To allow second generator 24 to slide shoreward and seaward along on modified frame 10a, the generator comprises a sleeve or ring 34a.

Figure 3A:
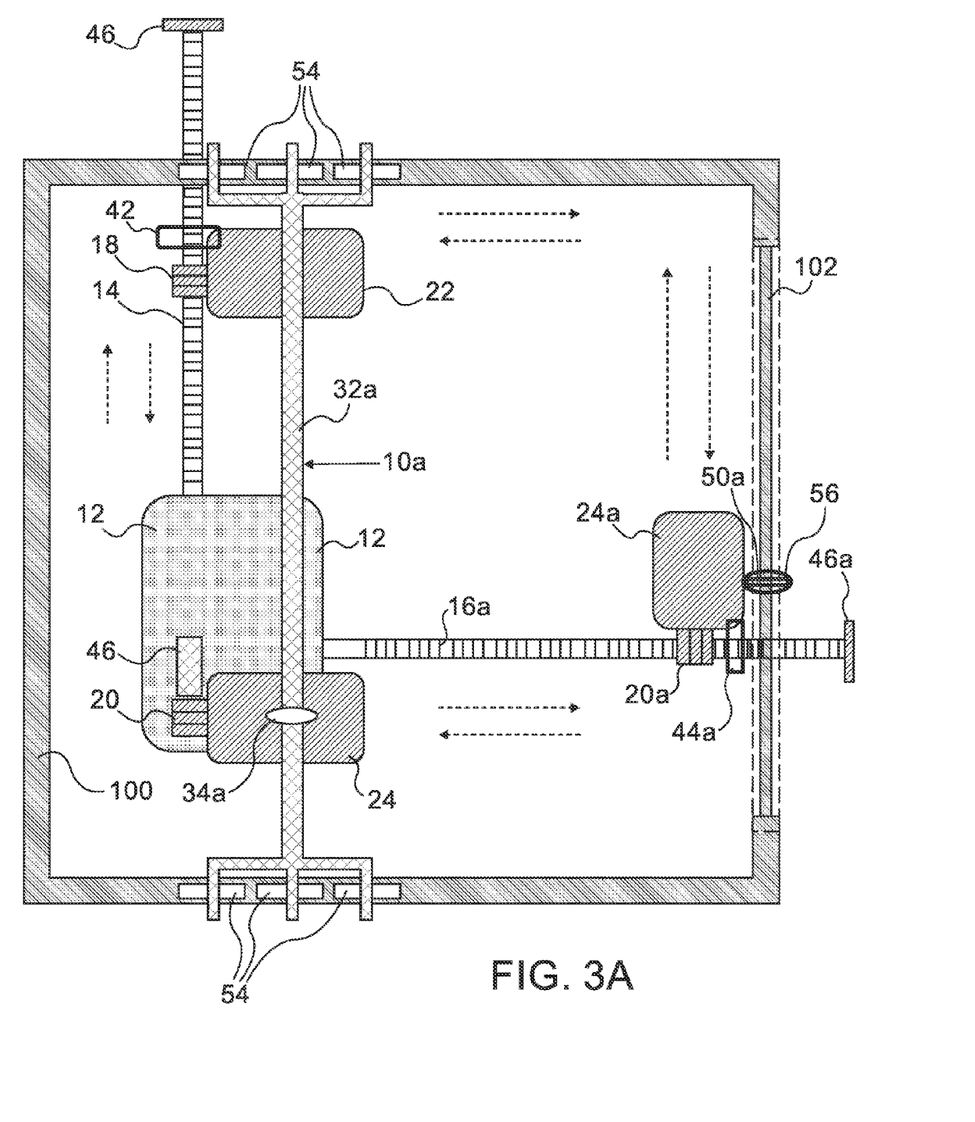
Figure 3B:
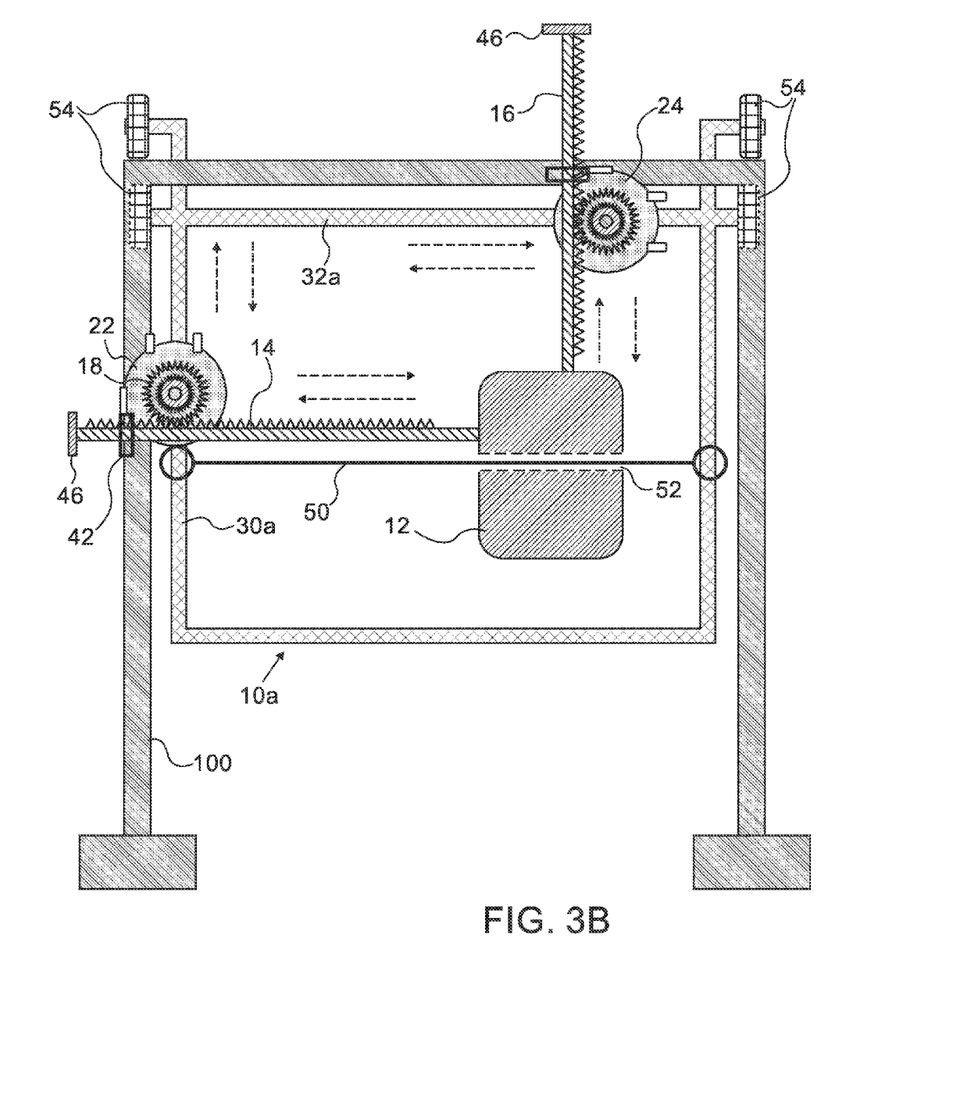
FIG. 3b is a right side view.
Figure 3C:
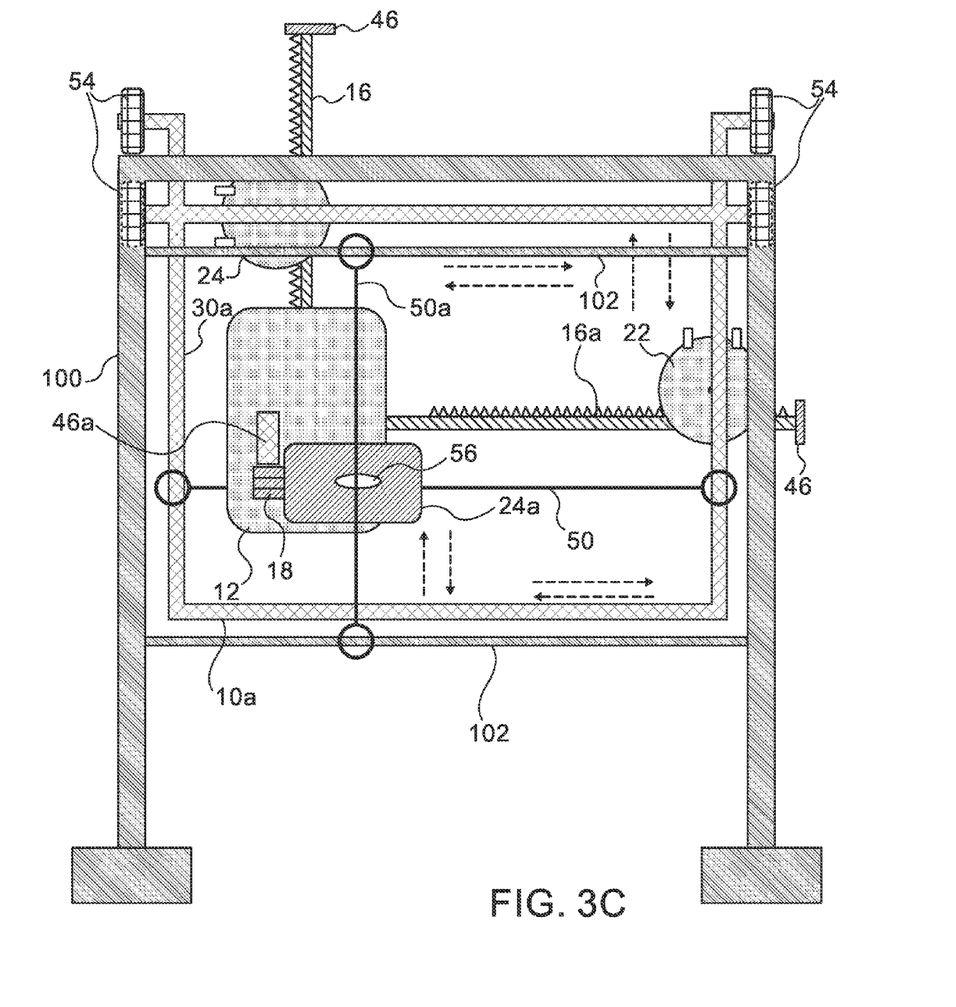
FIG. 3c is a left side view.
Figure 3D:
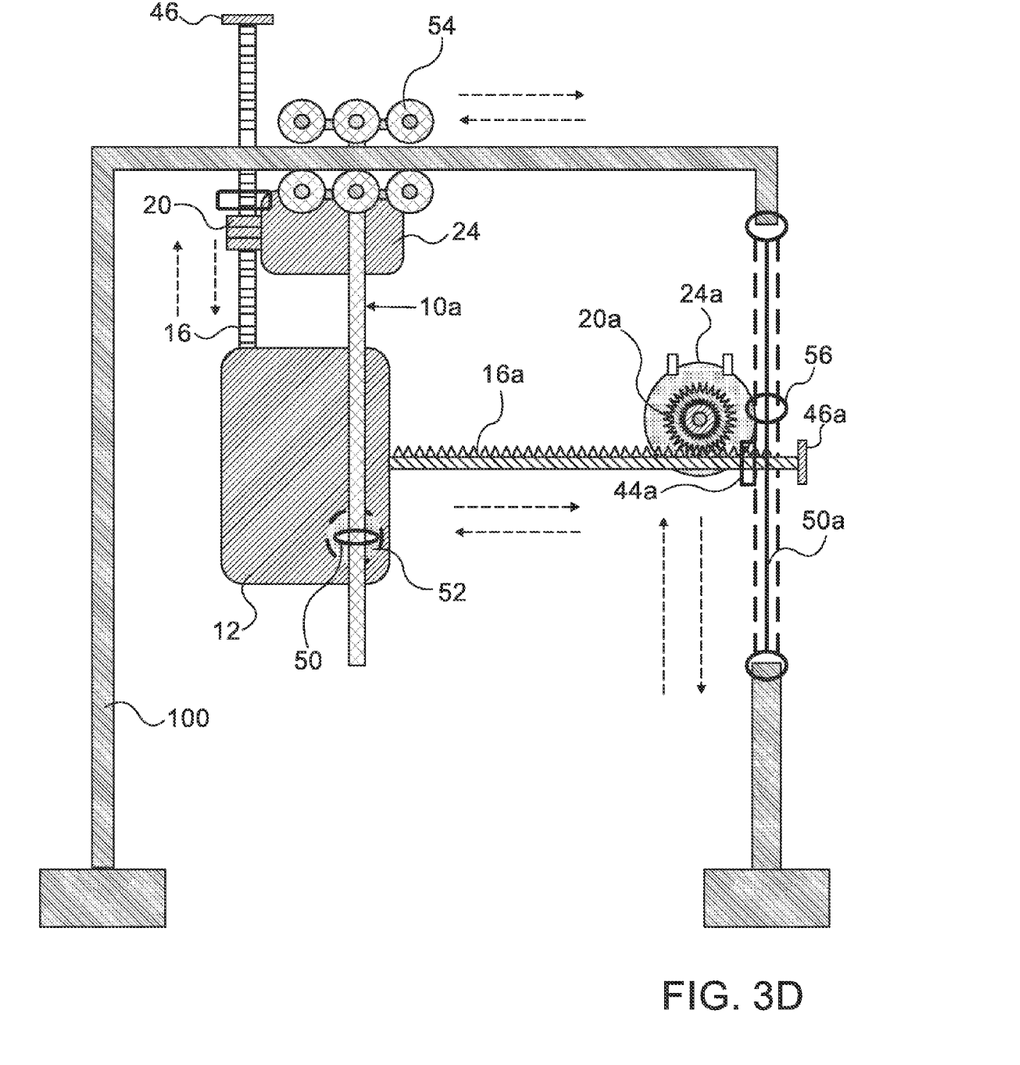
FIG. 3d is a front view.

For clarity, it is noted that in FIG. 3b there is seen first and second generators 22 and 24; while third generator 24a is hidden by float 12. In FIG. 3c there is seen third generator 24a; the back of first generator 22; and the back of second generator 24; and side of third generator 24a. There is no third alignment rod as two such rods are sufficient. In FIG. 3d there is seen a side view of second alignment rod 50a connected to third generator 24a by ring 56.

While it appears that the racks 14, 16 and 16a may have square or rectangular profiles, due to the side and front views shown in the figures, according to some embodiments, any or all or the racks can be designed in a dowel-like shape (i.e. with a circular cross-section), and in addition wherein only the top half or top portion is threaded. Such design will tend to provide for more flexibility in contact and alignment between the racks 14, 16 and 16a and their respective pinions 18, 20 and 20a.

Thus, there has been described an apparatus for convert energy from ocean swells (waves) to electrical energy—although it should be understood that the kinetic energy of the waves/swells can be converted to other forms of energy within the scope of the invention. The present apparatus exploits both the rise and fall of the waves/swells as well as the inward and outward movement thereof and without limitation to a location or particular height or height range of water. Embodiments have also been disclosed to (a) take into account the sideway motion of swells; (b) to ensure proper alignment of the float and generators (i.e. the connection mechanism connecting them, namely the respective racks and pinions) and (c) whereby three-directional movement (X, Y and Z) of the swells can be exploited.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. An apparatus for the conversion of the energy of sea or ocean swells, the apparatus comprising:
    a frame fixable in an area of the sea or ocean having swells and including a vertical post and horizontal beam;
    at least one first generator slidably connected to the vertical post;
    at least one second generator slidably connected to the horizontal beam;
    a first pinion operably connected to each of the at least one first generator;
    a second pinion operably connected to each of the at least one second generator;
    at least one float;
    a connection mechanism for keeping the float operably connected to the generators;
    a generally horizontal first rack operably connected to each of the at least one float for engaging the first pinion;
    a generally vertical second rack operably connected to each of the at least one float for respectively engaging the second pinion,
    wherein the connection mechanism comprises a first rack-to-generator connector and a second rack-to-generator connector through which the generally horizontal first rack and the generally vertical second rack respectively pass; and wherein all components connected to the float are disposed at or above sea level.

2. The apparatus of claim 1, wherein all moving parts are disposed at or above sea level.

3. The apparatus of claim 1, wherein the first generator is both slidingly and pivotally connected to the vertical post.

4. The apparatus of claim 1, further comprising a float alignment mechanism for aligning the float with the first generator.

5. The apparatus of claim 4, wherein the float alignment mechanism comprises an alignment rod slidingly connected the frame.

6. The apparatus of claim 1, further comprising at least one third generator, supported by the apparatus; a third pinion operably connected to each of the at least one third generator; and a third rack operably connected to the at least one float and for engaging the third pinion, wherein the third rack is generally orthogonal to both the first rack and the second rack.

7. The apparatus of claim 6, further comprising a support structure upon which the third generator is slidable.

8. The apparatus of claim 6, further comprising a float alignment mechanism for aligning the racks and the pinions.

9. The apparatus of claim 8, wherein the float alignment mechanism comprises a pair of generally orthogonal alignment rods.

10. The apparatus of claim 1, wherein it is not limited to any particular sea level or sea level range.

11. The apparatus of claim 1, wherein the horizontal rack is linear.

12. The apparatus of claim 1, wherein the at least one first generator are operably connected to first AC/DC convertor(s) and the at least one second generator is operably connected to at least one second AC/DC convertor.

13. The apparatus of claim 6, wherein the at least one third generator is operably connected to at least one third AC/DC convertor.

14. The apparatus of claim 1, wherein the frame is Pi-shaped.

15. The apparatus of claim 1, wherein the racks comprise stoppers to prevent disengagement from the generators.

* * * * *